(12) United States Patent
Jäckel

(10) Patent No.: US 7,637,804 B2
(45) Date of Patent: Dec. 29, 2009

(54) PACKAGING MACHINE FOR SAUSAGE PRODUCTION

(75) Inventor: Gunnar Jäckel, Asendorf (DE)

(73) Assignee: TIPPER TIE technopack GmbH (DE)

( * ) Notice: Subject to any disclaimer, the term of this patent is extended or adjusted under 35 U.S.C. 154(b) by 444 days.

(21) Appl. No.: 11/596,528

(22) PCT Filed: May 12, 2005

(86) PCT No.: PCT/EP2005/005187

§ 371 (c)(1),
(2), (4) Date: Nov. 13, 2006

(87) PCT Pub. No.: WO2005/110100

PCT Pub. Date: Nov. 24, 2005

(65) Prior Publication Data

US 2007/0287369 A1    Dec. 13, 2007

(30) Foreign Application Priority Data

May 12, 2004   (DE) ............... 20 2004 007 787 U

(51) Int. Cl.
*A22C 11/00* (2006.01)
(52) U.S. Cl. .................................................. 452/31
(58) Field of Classification Search ............ 452/30–32, 452/35–38, 46–48, 51
See application file for complete search history.

(56) References Cited

U.S. PATENT DOCUMENTS 4,580,316 A * 4/1986 Gunter ..................... 452/22
6,117,003 A * 9/2000 Brinson ..................... 452/31
7,306,511 B2 * 12/2007 Whittlesey et al. ......... 452/45
7,386,966 B2 * 6/2008 Griggs et al. .............. 53/138.2
7,472,525 B2 * 1/2009 Griggs et al. .............. 53/417
7,488,243 B2 * 2/2009 Wince et al. ............... 452/30

FOREIGN PATENT DOCUMENTS

DE          2203695         1/1972
DE          19850748 A1     11/1998

OTHER PUBLICATIONS

DCE 7410, Poly-clip System GmbH & Co. KG Catalogue, Jan. 1999, E10-1.
DCE 6410, PROFIL, vol. 29, Jul. 1995, E7-9.
Kollmannsberger "Clippen auf hohem Niveau" Die Fleischerei, D-86816, Jun. 1998, E6.

* cited by examiner

*Primary Examiner*—Thomas Price
(74) *Attorney, Agent, or Firm*—Casimir Jones, S.C.

(57) ABSTRACT

The subject matter of the invention is a packaging machine for sausage production, with a filling pipe (1) and a skin brake (2) with at least one active component, the skin brake (2) being releasable from its working position and having a metallic component (5). The packaging machine is distinguished in that an inductive sensor (6*a*) with a measuring field is provided which is oriented in such a manner that it detects the metallic component (5) of the skin brake (2) in its working position. This makes it possible in a simple manner to automatically ascertain whether the skin brake (2) is in its working position.

8 Claims, 2 Drawing Sheets

PACKAGING MACHINE FOR SAUSAGE PRODUCTION

The invention relates to a packaging machine for sausage production according to the precharacterizing clause of patent claim 1.

Packaging machines of the generic type have a filling pipe with an input end and an output end. A filling machine fills sausage meat into the input end, the sausage meat then being supplied to the packaging machine through the filling pipe. A sausage skin which is sealed on one side is pulled over the output end of the filling pipe. By means of the pressure of the meat forced through the pipe, said sausage skin is gradually removed from the pipe. The output end of the filling pipe is followed in the filling direction by a sealing device which seals the filled skin section by section, for example with clips, so that individual sausages are gradually packaged.

For correct functioning of the machine, it is crucial for the skin to be removed as uniformly as possible from the pipe. In order to achieve this, it is known to counter the movement of the skin on the filling pipe with a frictional force. For this purpose, use is made of what is referred to as a skin brake. A skin brake can be any object which is capable of exerting a frictional force of this type on the outside of the moving skin. Usually, these are rings made of rubber or similarly elastic material which tightly surround the filling pipe, so that the filling pipe only surrounds a narrow annular gap. It is also conceivable for the elastic material to rest on the pipe and for an annular gap to be produced only by a skin being pulled between pipe and skin brake. The skin brake generally comprises a plurality of components, i.e., in addition to the active component or active components, that is the actual body or bodies resting on the skin, for example comprises a securing means for this body and a housing. The components of the skin brake are generally composed of plastic or rubber. However, components made of metal are also known.

So that the skin brake can fulfil its purposes, it is arranged in the region of the output end of the filling pipe. In this region, it is in its working position. In this case, the filling position is that position of the skin brake within the working position, in which the skin brake is situated during the filling of the skin. The active components are then situated on the pipe in the vicinity of its output end. In order to simplify the pulling on of a skin, known devices make provision for the skin brake to be easily moveable within the working position from the filling position into a skin-changing position. This is achieved by the skin brake being moveable or pivotable.

For maintenance and cleaning purposes, the skin brake can be released from its working position.

In practice, there is the problem that it is sometimes forgotten to bring the skin brake back into its working position again after maintenance or cleaning thereof.

The invention has the object of making it possible in a simple manner to automatically ascertain whether the skin brake is in its working position. It achieves this object by means of the features of the characterizing part of patent claim 1.

An inductive sensor within the context of the invention is a measuring implement which uses electromagnetic induction to measure whether metallic objects are situated in its vicinity. The strength of the output signal of the sensor depends in particular on how near metallic material is situated to the sensor and how much of it there is.

The measuring field of an inductive sensor is the spatial region in which the sensor still perceives changes in the position and/or the amount of metallic material, i.e. in which changes of this type lead to a change in the output signal.

It is insignificant as to where the metallic component is specifically situated on the releasable skin brake. At any rate, in the working position of the skin brake, the metallic component is situated in the measuring field of the inductive sensor, so that it is detected by it. In this manner, it can be ascertained with reference to the output signal whether the skin brake is in its working position. Specifically, it is conceivable for the operator to bring the skin brake into its working position, then to trigger a programming signal, as a result of which a memory unit receives the output signal, which is then supplied, from the inductive sensor (desired signal). Subsequently, an evaluation unit continuously compares the stored desired signal with the continuously tapped-off output signal of the inductive sensor (actual signal). If the evaluation unit ascertains that there is a difference, with it being possible for an optionally settable tolerance to be taken into consideration, it supplies a warning signal. The latter can be used, for example, to automatically switch off the filling machine and, if appropriate, also the sealing device or to block the switching on thereof.

It is also conceivable to set the desired signal and the tolerances in such a manner that a difference of the desired signal from the actual signal is already ascertained and a warning signal is output if the skin brake has left its filling position instead of its working position. It is also possible to operate with two desired and two warning signals and corresponding tolerances, so that the evaluation unit detects whether the skin brake is (a) in the working position and in the filling position, (b) in the working position outside the filling position, and (c) outside the working position.

The metallic component is advantageously arranged in a rotationally symmetrical manner with respect to the position of the filling pipe in the filling position of the skin brake. The resultantly achieved advantage comes to bear if the active component or components of the skin brake is or are situated on a rotary part which is mounted parallel to the filling pipe in a manner such that it can rotate about an axis of rotation. Such rotatability is desired in the case of applications in which a skin is pulled onto the pipe in a twisted manner, since it then takes up less space. During removal from the pipe, the skin relaxes from this twisted position. A shearing force then occurs on the active component or active components of the skin brake, which shearing force may result, under some circumstances, in the skin tearing. This problem is mitigated by said rotatability. If, however, there is such rotatability, other sensor methods, for example with a magnet which is fitted to the skin brake and is detected by a corresponding sensor (for example reed switch), would fail, since the magnet or the other component acting on the sensor would be brought out of its position as a consequence of the rotational movement; that is to say, the sensor could no longer differentiate whether the skin brake has been removed out of its working position or merely rotated. It is indeed conceivable for the component acting on the sensor to be fitted to a part not belonging to the rotary part. However, there are constructions in which such a part is not present because the entire skin brake is rotatable, or the remaining components are not suitable for receiving a component acting on a sensor.

In these cases, the superiority of an inductive sensor comes to bear if the metallic component is arranged in a rotationally symmetrical manner around the axis of rotation. In this case, the metallic material is always distributed uniformly in the measuring field, so that a rotation of the rotary part does not lead to a change in the output signal of the inductive sensor.

At any rate, there is advantageously a further inductive sensor, in the measuring field of which a metallic component of the skin brake is likewise situated. This permits a redundancy: an evaluation unit checks whether the sensors supply a changed output signal at the same time. If this is not the case, there is a malfunction of one of the sensors, which means that the evaluation signal may trigger an erroneous signal. In the case of a plurality of sensors, correspondingly more desired signals would have to be picked up and correspondingly more comparisons with actual signals would have to be undertaken by the evaluation unit.

In this case, it is conceivable to provide an evaluation unit with a dedicated desired signal and, if appropriate, a tolerance for each senor, so that each evaluation unit supplies a warning signal which is evaluated by a primary evaluation unit. In the case of an arrangement of this type, the sensors can be connected in such a manner that the one closes a signal line if it ascertains a relevant difference of the actual signal from the desired signal, and the other conversely opens a signal line in such a case. In this case, the primary evaluation unit can also output a warning signal in the event of a short circuit or a cable break.

At any rate, in an advantageous manner, two sensors are situated on that side of the skin brake which faces the filling machine. According to the applicant's experiences, this has proven favorable for space reasons.

Advantageously, at least two sensors are offset by approximately 45° with respect to the axis of rotation in the plane perpendicular to the axis of rotation. The applicant could surprisingly ascertain that a space-saving arrangement of the sensors overall with simultaneously particularly little mutual influencing of the sensors is thereby achieved.

Not every skin brake is suitable for every application. For example, different types of sausage generally require skin brakes of differing size. A plurality of skin brakes which are exchanged can therefore be provided for a generic machine.

In such a case, it is advantageous that a plurality of exchangeable skin brakes contain metallic components in the same arrangement. For example, it is conceivable that the skin brakes are overall composed of plastic and/or rubber, but all of them are bordered by a metal ring of the same size, same position and of the same material. In this case, the output signal of the inductive sensor is the same for all of the skin brakes. This has the advantage that the changing of skin brake does not have an effect on the evaluation of the output signal of the sensor or the output signals of the sensors. A new desired signal does not have to be picked up when changing the skin brake.

Conversely, however, a plurality of interchangeable skin brakes can also be provided with metallic components in a different arrangement, which in each case trigger different output signals in the inductive sensor or sensors. This enables an evaluation unit to differentiate between the individual skin brakes, so that it can be checked automatically whether the selected skin brake fits the application furthermore set at the machine.

It is conceivable, for example, that, for each of the skin brakes, a desired signal is picked up which is stored separately. The evaluation unit can then constantly check whether and, if appropriate, which of the desired signals corresponds to the actual signal, and can then output a warning signal or a signal which stands for a certain skin brake.

The invention is explained in more detail below with reference to an exemplary embodiment. In the drawing.

Figure 1:
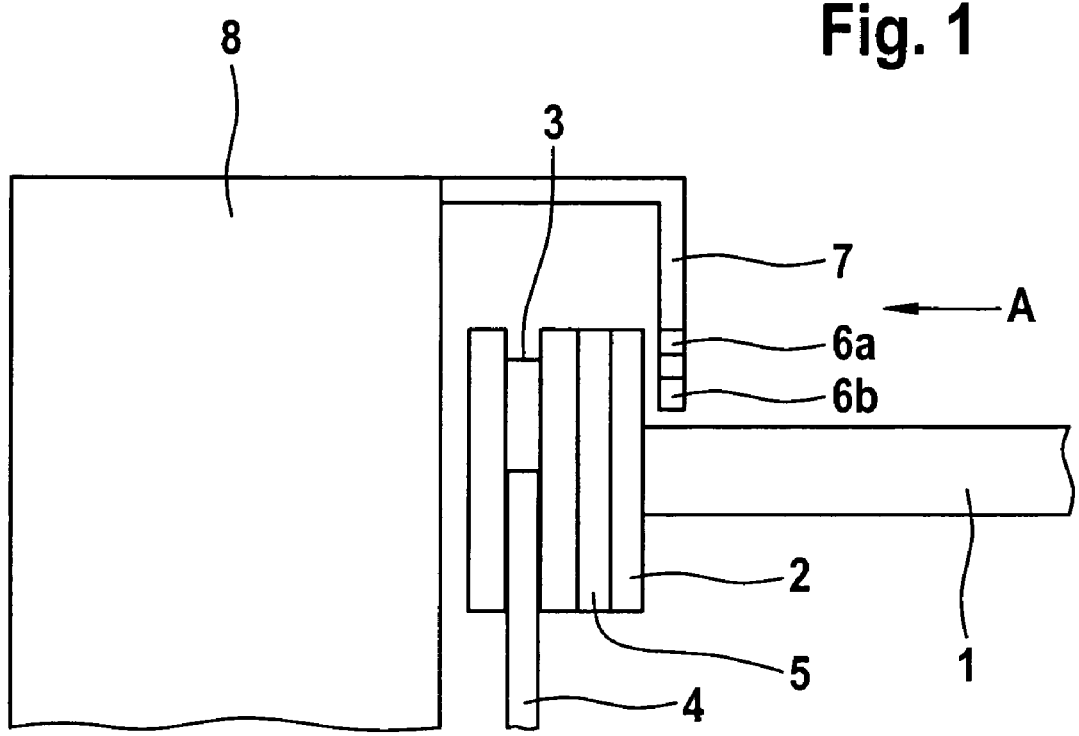
FIG. 1 shows a diagrammatic illustration of a machine according to the invention in side view.
Figure 2:
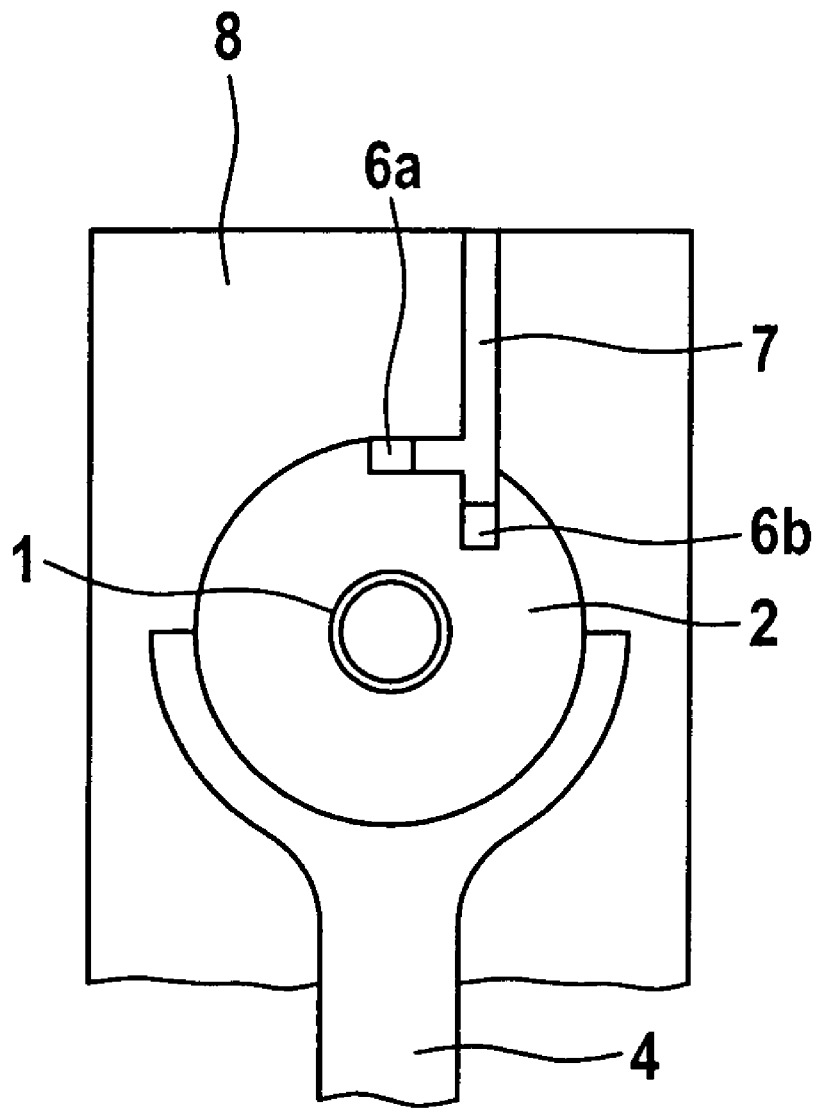
FIG. 2 shows a diagrammatic illustration of the same machine in the viewing direction A from FIG. 1.

A filling pipe 1, which is illustrated in cutaway form in FIG. 1, opens into a skin brake 2 which is in its working position. Of the skin brake 2, the housing is shown here. The active component (not illustrated) is situated in the interior of the housing. On its circumference, the skin brake 2 has an encircling annular groove 3 into which the arms of a stand 4 that are arranged in a semicircular manner grasp. In this manner, the skin brake 3 as a whole is both rotatably mounted in the stand 4 and also is removable therefrom, i.e. is releasable from its working position illustrated.

An encircling metal ring 5 is situated on the skin brake 2. Said metal ring is situated in the measuring field of two inductive sensors 6a and 6b which are arranged in a plane perpendicular to the axis of rotation of the skin brake 2 and offset by 45° with respect to the axis of rotation. The sensors 6a, 6b are fastened via a support 7 to the sealing device 8, which is illustrated diagrammatically as a trimmed block.

The invention claimed is:

1. A packaging machine for sausage production, comprising a filling pipe (1) and a skin brake (2) with at least one active component and at least one metallic component (5), wherein said skin brake has a working position in the region of an output end of said filling pipe, said skin brake (2) being releasable and movable from its working position, wherein said packaging machine comprises an inductive sensor (6a) with a measuring field oriented in such a manner that said induction sensor detects at least one metallic component (5) of the skin brake (2) when said skin brake is in its working position.

2. The packaging machine as claimed in patent claim 1, wherein said at least one metallic component (5) of said skin break is arranged in a rotationally symmetrical manner around an axis of rotation.

3. The packaging machine of claim 1, wherein said packing machine further comprises a second inductive sensor (6b) with a measuring field and wherein at least one metallic component (5) of the skin brake (2) is situated in the measuring field of the second sensor (6b) when said skin break is in its working position.

4. The packaging machine as claimed in patent claim 3, characterized in that the same metallic component (5) of the skin brake (2) is situated in the measuring fields of the first sensor (6a) and of the second sensor (6b).

5. The packaging machine as claimed in patent claim 3 or 4, characterized in that two sensors (6a, 6b) are situated on that side of the skin brake (2) which faces the filling machine.

6. The packaging machine as claimed in patent claim 5, characterized in that the two sensors (6a, 6b) are offset by approximately 45° with respect to the center of the filling pipe (1) in the plane perpendicular to the filling pipe (1).

7. The packaging machine as claimed in claim 1, characterized in that there are a plurality of exchangeable skin brakes (2) which contain metallic components in the same arrangement.

8. The packaging machine as claimed in claim 1, characterized in that there are a plurality of exchangeable skin brakes (2) which contain metallic components (5) in a different arrangement which each trigger different output signals in the inductive sensor or inductive sensors (6a, 6b).

* * * * *